(12) United States Patent
Nolta, Jr. et al.

(10) Patent No.: US 9,657,956 B2
(45) Date of Patent: May 23, 2017

(54) MULTI-STAGE DOOR SEALING AND AIRFLOW RELEASE

(71) Applicant: VISTEON GLOBAL TECHNOLOGIES, INC., Van Buren Township, MI (US)

(72) Inventors: Jim Patrick Nolta, Jr., Canton, MI (US); Jayanthi Iyer, Northville, MI (US)

(73) Assignee: HANON SYSTEMS, Daejeon-si (KR)

( * ) Notice: Subject to any disclaimer, the term of this patent is extended or adjusted under 35 U.S.C. 154(b) by 786 days.

(21) Appl. No.: 13/834,471

(22) Filed: Mar. 15, 2013

(65) Prior Publication Data

US 2014/0004784 A1 Jan. 2, 2014

Related U.S. Application Data

(60) Provisional application No. 61/666,300, filed on Jun. 29, 2012.

(51) Int. Cl.
*F24F 7/00* (2006.01)
*B60H 1/00* (2006.01)

(52) U.S. Cl.
CPC .......... *F24F 7/00* (2013.01); *B60H 1/00685* (2013.01); *B60H 2001/00714* (2013.01)

(58) Field of Classification Search
CPC ............ B60H 1/00678; B60H 1/00685; B60H 1/00664; B60H 2001/00714; B60H 2001/00721; B60H 2001/006; F16K 47/045
USPC ............................ 454/155, 152, 333; 49/385
See application file for complete search history.

(56) References Cited

U.S. PATENT DOCUMENTS 7,575,511 B2 *  8/2009  Haupt ................ B60H 1/00685
                                                   454/156

\* cited by examiner

*Primary Examiner* — Steven B McAllister
*Assistant Examiner* — Ko-Wei Lin
(74) *Attorney, Agent, or Firm* — Fraser Clemens Martin & Miller LLC; James D. Miller

(57) ABSTRACT

A temperature door for an air handling system of a heating, ventilating, and air conditioning system includes a first surface defining a sealing perimeter and a pivoting structure coupled to the first surface and defining an axis. The first surface is configured to pivot about the axis in the housing of the air handling system. A sealing lip is disposed about the sealing perimeter of the first surface and is adapted to engage a corresponding sealing surface of the housing of the air handling system. A pivoting of the first surface about the axis from a sealed position causes a progressive disengagement of the sealing lip from the sealing surface beginning in a location proximate the axis while at least a portion of the sealing lip remains engaged with the sealing surface at a location spaced from the axis.

20 Claims, 10 Drawing Sheets

MULTI-STAGE DOOR SEALING AND AIRFLOW RELEASE

CROSS REFERENCE TO RELATED APPLICATION

This application claims the benefit under 35 U.S.C. §119(e) of U.S. Provisional Patent Application No. 61/666,300, filed on Jun. 29, 2012, the content of which is incorporated by reference herein in its entirety.

FIELD OF THE INVENTION

The invention relates to a heating, ventilating, and air conditioning system for a vehicle and more particularly to sealing of a temperature door in an air-handling system to control discharge air temperature and to optimize temperature stratification in the air-handling system.

BACKGROUND OF THE INVENTION

A vehicle may typically include a climate control system which maintains a temperature within a passenger compartment of the vehicle at a comfortable level by providing heating, cooling, and ventilation. Comfort may be maintained in the passenger compartment by an integrated system referred to as a heating, ventilating and air conditioning (HVAC) air-handling system. The HVAC air-handling system conditions air flowing therethrough and distributes the conditioned air throughout the passenger compartment.

The design of an HVAC air-handling system includes features that control air flow volume, air temperature, and air flow paths, for example. Performance of the HVAC air-handling system may be designed to comply with particular targets including temperature stratification, wherein stratification is the temperature difference between various outlets of the HVAC air-handling system. For some operating states it may be desirable to manipulate hot air streams and cold air streams to produce a stratification between outlets. For other operating states no stratification is desired. The level of desired stratification may fluctuate and design features may allow stratification to be adjustable.

To comply with the desired stratification targets, HVAC air-handling systems may include features including baffles, conduits, mixing plates, and/or doors to facilitate mixing of hot air streams with cold air streams. The addition of these features and/or components can reduce airflow, degrade flow efficiency, increase noise, and increase the cost and weight of the system. Further, many of the prior art systems fail to meet the desired stratification targets.

In certain systems, adjustable HVAC doors seal against mating sealing surfaces to position the HVAC doors and to facilitate mixing of hot air streams with cold air streams. Known adjustable HVAC doors seal against mating sealing surfaces in one single variable stage as the door closes. As a non-limiting example, as a rotationally actuated door rotates from an open position to a closed position, it first seals against sealing surfaces closest to the centerline of rotation of the door, and then lastly seals against sealing surfaces furthest from the centerline of rotation of the door. Similarly, as a rotationally actuated door rotates from a closed position to an open position, the door seal pulls away along multiple surfaces (e.g., as many as three or six surfaces) all at one time, releasing a proportionally high volume of air flow all at one time, especially along the surfaces furthest from the centerline of rotation of the door. This high volume release of airflow can create problems with temperature linearity control, airflow bleed, and distribution control.

To control the volume of airflow release, small gaps can be provided to shade walls adjacent to the door (or variable gaps that reduce to 0 mm). While this can be an effective way to control the amount of airflow volume that flows past the door, it can be susceptible to unwanted noise, vibration, and harshness (NVH) (e.g., scraping, squeaking, hooting, whistles, etc.) and door binding. Accordingly, improvements in ways of opening, closing, and sealing HVAC doors are desirable to optimize HVAC air-handing system operation, wherein a cost and a weight of the system are minimized, and airflow, noise, flow efficiency and stratification of the system are optimized.

SUMMARY OF THE INVENTION

Concordant and consistent with the present invention, an improved mechanism for opening, closing, and sealing HVAC doors to optimize HVAC air-handling system operation that minimizes a cost and a weight of the system and that further optimizes airflow, noise, flow efficiency and stratification of the system has surprisingly been discovered.

In one embodiment, a temperature door for an air handling system of a heating, ventilating, and air conditioning system for a vehicle includes a first surface defining a sealing perimeter and a pivoting structure coupled to the first surface and defining an axis, wherein the first surface is configured to pivot about the axis in the housing of the air handling system. A sealing lip is disposed about the sealing perimeter of the first surface and is adapted to engage a corresponding sealing surface of the housing of the air handling system. A rotation of the first surface about the axis from a sealed position causes a progressive disengagement of the sealing lip from the sealing surface beginning in a location proximate the axis while at least a portion of the sealing lip remains engaged with the sealing surface at a location spaced from the axis.

In another embodiment, the pivoting structure is coupled to the first surface to define an axis, wherein the first surface is configured to pivot about the axis in the housing of the air handling system. The first surface further includes a first radial edge and a second radial edge extending radially outwardly from the axis, and a distal edge spaced from the axis and extending from the first radial edge to the second radial edge. A first radial sealing lip is disposed on the first radial edge. A second radial sealing lip is disposed on the second radial edge. A distal sealing lip is disposed on the distal edge. The first radial sealing lip, the second radial sealing lip and the distal sealing lip are arranged to define a sealing perimeter of the first surface that is adapted to engage a corresponding sealing surface of the housing of the air handling system. A rotation of the first surface about the axis from a sealed position causes a progressive disengagement of the first radial sealing lip and the second radial sealing lip from the sealing surface beginning in a location proximate the axis, while the distal sealing lip remains engaged with the sealing surface at a location spaced from the axis.

In another embodiment, the first radial sealing lip, the second radial sealing lip, and the distal sealing lip define a sealing perimeter of the first surface adapted to engage a corresponding sealing surface of the housing of the air handling system. A first rotation of the first surface about the axis from the first seal position to a second seal position causes formation of a first gap between the first radial sealing lip and the sealing surface and a second gap between the second radial sealing lip and the sealing surface while the distal sealing lip remains engaged with the sealing surface at a location spaced from the axis. A second rotation of the first surface about the axis from the second seal position to an unsealed position disengages the distal sealing lip from the sealing surface to form a third gap between the distal sealing lip and the sealing surface. The first rotation and the second rotation may occur in a linear or in a non-linear fashion to optimize control of the first gap, the second gap and the third gap, and resulting airflow therethrough.

Advantages of the present technology include the fact that the door seal does not release against all the sealing surfaces all at one time. With the multi stage sealing provided herein, the seal first releases from some surfaces, then after additional door rotation the seal releases from the other surfaces. Thus, instead of one full release of proportionally high volume of airflow all at one time, the seal will release two or more smaller volumes of airflow. This allows for better temperature linearity control, better airflow bleed, and improved distribution control.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
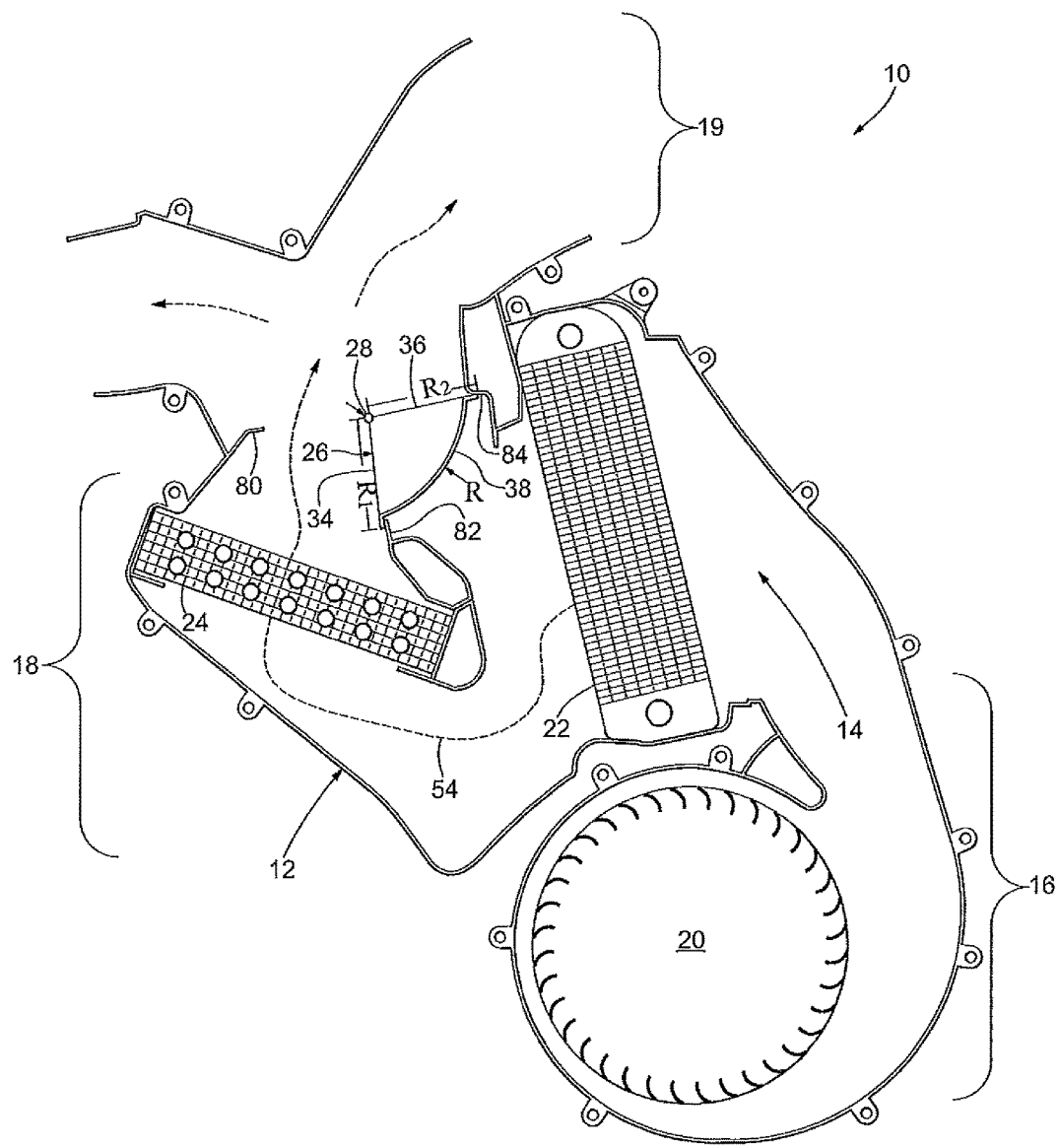
FIG. 1 is a top plan view of a temperature control system for an air-handling system of a heating, ventilating, and air conditioning system for a vehicle showing a temperature door and a first housing, wherein the temperature door is in a hot air position.

FIG. 1 shows an air-handling system 10 of a heating, ventilating, and air conditioning (HVAC) system or climate control system (not shown) for a vehicle (not shown) according to an embodiment of the invention. As used herein, the term air can refer to fluid in a gaseous state, fluid in a liquid state, or any combination thereof. The air-handling system 10 is also commonly referred to as a HVAC air-handling system. It is understood that the invention can be used with other types of air-handling systems as desired, such as an auxiliary or rear air-handling system, a lateral or "handed" air-handling system, and a center mount and a semi-center mount air-handling system, for example. The air-handling system 10 typically provides heating, ventilation, and air conditioning for a passenger compartment (not shown) of the vehicle. The air-handling system 10 is adapted to be installed between vehicle sheet metal (not shown) and an interior trim panel (not shown). It is understood that the air-handling system 10 can be installed in other locations in the vehicle as desired, such as under an instrument panel, to a dash panel, in a trunk, in a console, under a floor, in a headliner, or in an engine compartment, for example.

The air-handling system 10 includes a first housing 12 and a second housing (not shown). In the embodiment shown, the first housing 12 and the second housing are formed from plastic and interface with each other. It is understood that the housings can be formed from other materials as desired. The first housing 12 and the second housing can be an upper housing and a lower housing cooperating to form a hollow main housing with a source air flow conduit 14 formed therein.

The first housing 12 and the second housing include an inlet section 16, a mixing and conditioning section 18, and a delivery section 19. An air inlet aperture 20 is formed in the inlet section 16 and is in fluid communication with a supply of air. If desired, a filter (not shown) can be provided upstream or downstream of the inlet section 16. The supply of air can be provided from outside of the vehicle, recirculated from the passenger compartment of the vehicle, or a mixture of the two, for example. The mixing and conditioning section 18 receives an evaporator core 22, a heater core 24, and a temperature door 26 therein. The evaporator core 22 and the heater core 24 are in communication with a source of cooled fluid (not shown) and a source of heated fluid (not shown) respectively.

Figure 2:
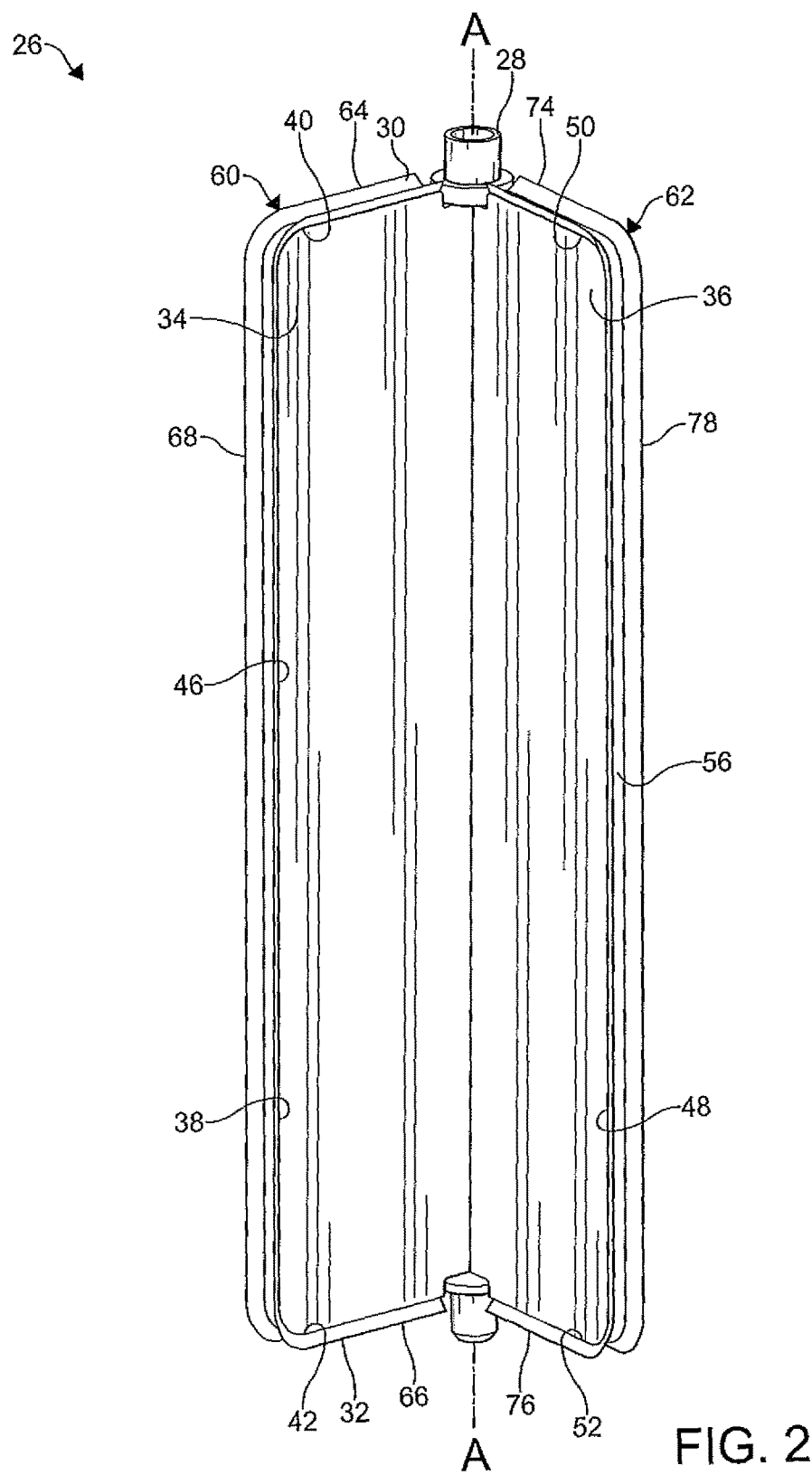
FIG. 2 is a front perspective view of the temperature door illustrated in FIG. 1, according to an embodiment of the invention.

As more clearly shown in FIG. 2, the temperature door 26 is disposed on a shaft 28 that is pivotally disposed in the housing 12. One end of the shaft 28 is received in an aperture (not shown) of the first housing 12 and the other end of the shaft 28 is received in an aperture (not shown) of the second housing. In the embodiment shown, the shaft 28 extends from a first end 30 of the temperature door 26 to a second end 32 of the temperature door 26. The shaft 28 extends outwardly beyond the first end 30 of the temperature door 26 and outwardly beyond the second end 32 of the temperature door 26. It is understood that the shaft 28 can be flush with or recessed from the ends of the temperature door 26. The shaft 28 is adapted to be connected to an actuator mechanism (not shown) such as an electrical positioning motor, for example, for controlling a pivotal position of the temperature door 26. It is understood that the actuator mechanism can be electrically operated, mechanically operated, or fluid operated, for example. It is also understood that the temperature door 26 can be directly connected to the actuator mechanism. In this case, the shaft 28 could be discontinuous from the first end 30 to the second end 32 of the temperature door 26, or the shaft 28 may be unnecessary and could be removed from the temperature door 26.

In the embodiment shown, the temperature door 26 is substantially V-shaped in cross-section. It is understood that other shapes and types of temperature doors 26 can be used as desired. A first leg of the V is formed by a first sealing surface 34 having a surface radius R1. A second leg of the V is formed by a second sealing surface 36 having a surface radius R2. A plane including the first sealing surface 34 and a plane including the second sealing surface 36 intersect at the shaft 28. In the embodiment shown, the first sealing surface 34 and the second sealing surface 36 are disposed at an angle of substantially 90 degrees with respect to one another. However, the first sealing surface 34 and the second sealing surface 36 can be disposed at other angles relative to one another, as desired. The first sealing surface 34 includes a peripheral outer edge 38 defined by a first radially extending edge 40, a second radially extending edge 42, and a distal edge 46. As shown in FIG. 2, the shaft 28 is coupled to the first sealing surface 34. The second sealing surface 36 includes a peripheral outer edge 48 defined by a first radially extending edge 50, a second radially extending edge 52, and a distal edge 56. As shown in FIG. 2, the shaft 28 is coupled to the second sealing surface 36. The first sealing surface 34 and the second sealing surface 36 pivot about an axis A-A defined by the shaft 28.

A first sealing lip 60 is disposed on the peripheral outer edge 38 of the first sealing surface 34. Similarly, a second sealing lip 62 is disposed on the peripheral outer edge 48 of the second sealing surface 36. The first sealing lip 60 of the first sealing surface 34 is defined by a first radial seal 64 disposed on the first radially extending edge 40 of the first sealing surface 34, a second radial seal 66 disposed on the second radially extending edge 42 of the first sealing surface, and a distal seal 68 disposed on the distal edge 46 of the first sealing surface 34.

The second sealing lip 62 of the second sealing surface 36 is defined by a first radial seal 74 disposed on the first radially extending edge 50 of the second sealing surface 36, a second radial seal 76 disposed on the second radially extending edge 52 of the second sealing surface, and a distal seal 78 disposed on the distal edge 56 of the second sealing surface 36.

In the embodiment shown, the sealing lips 60, 62 are formed from a thermoplastic, such as a thermoplastic vulcanizate, for example. It is understood that the sealing lips 60, 62 can be formed from other materials as desired. As a non-limiting example, the sealing lips 60, 62 may be attached to respective sealing surfaces 34, 36 via injection molding where the seal material is made of a resilient compound, such as TPV, TEO, TPE, or other compound. It is also understood that the sealing lips 60, 62 may have other lengths, shapes and configurations than shown in FIGS. 2-7. The temperature door 26 may further include additional aspects. As a first non-limiting example, the temperature door 26 may include features described in U.S. Pat. No. 7,575,511 to Haupt et al., which is incorporated herein by reference in its entirety. As a second non-limiting example, movement of the temperature door may be linear, non-linear, or a combination thereof, as described in U.S. patent application Ser. No. 13/803,699, entitled "Constant to Variable Gear Pitch for Temperature Door Rotation", co-pending herewith, the disclosure of which is incorporated herein by reference in its entirety.

With reference to FIG. 1, the mixing and conditioning section 18 includes a first housing wall 80, a second housing wall 82, and a third housing wall 84. It is understood that the housing walls 80, 82, 84 can be formed integrally with other structure of the mixing and conditioning section 18, or can be formed separately and mounted in the mixing and conditioning section 18.

The first housing wall 80 sealingly engages the first sealing lip 60 of the temperature door 26 while the system is in a cold air position. Also, in the cold air position, the second housing wall 82 sealingly engages the second sealing lip 62 of the temperature door 26.

The second housing wall 82 sealingly engages the first sealing lip 60 of the temperature door 26 while the system is in a hot air position. Also in the hot air position, the third housing wall 84 sealingly engages the sealing lip 62 of the temperature door 26.

In operation, the air-handling system 10 conditions air by heating or cooling/dehumidifying the air and providing the conditioned air to the passenger compartment of the vehicle. Air is drawn into the air-handling system 10 through the air inlet aperture 20, flows through the source air flow conduit 14, and into the mixing and conditioning section 18.

The air flows to the evaporator core 22 where the air is cooled and dehumidified by transfer of heat from the air to a fluid (not shown) circulated through the evaporator core 22. The conditioned, cooled air stream then exits the evaporator core 22. The air then flows through the air-handling system 10 according to the position of the temperature door 26.

It is understood that the amount and temperature of air permitted to flow through the mixing and conditioning section 18 depends on the position of the temperature door 26. As the temperature door 26 approaches the hot air position as shown in FIG. 1, additional air is permitted to flow through the heater core 24. It is further understood that a temperature of the conditioned air stream upstream of the delivery section 19 can be controlled as desired between a maximum temperature equal to the temperature of the air exiting the heater core 24 and a minimum temperature equal to the temperature of the air exiting the evaporator core 22 by controlling the position of the temperature door 26.

Figure 3:
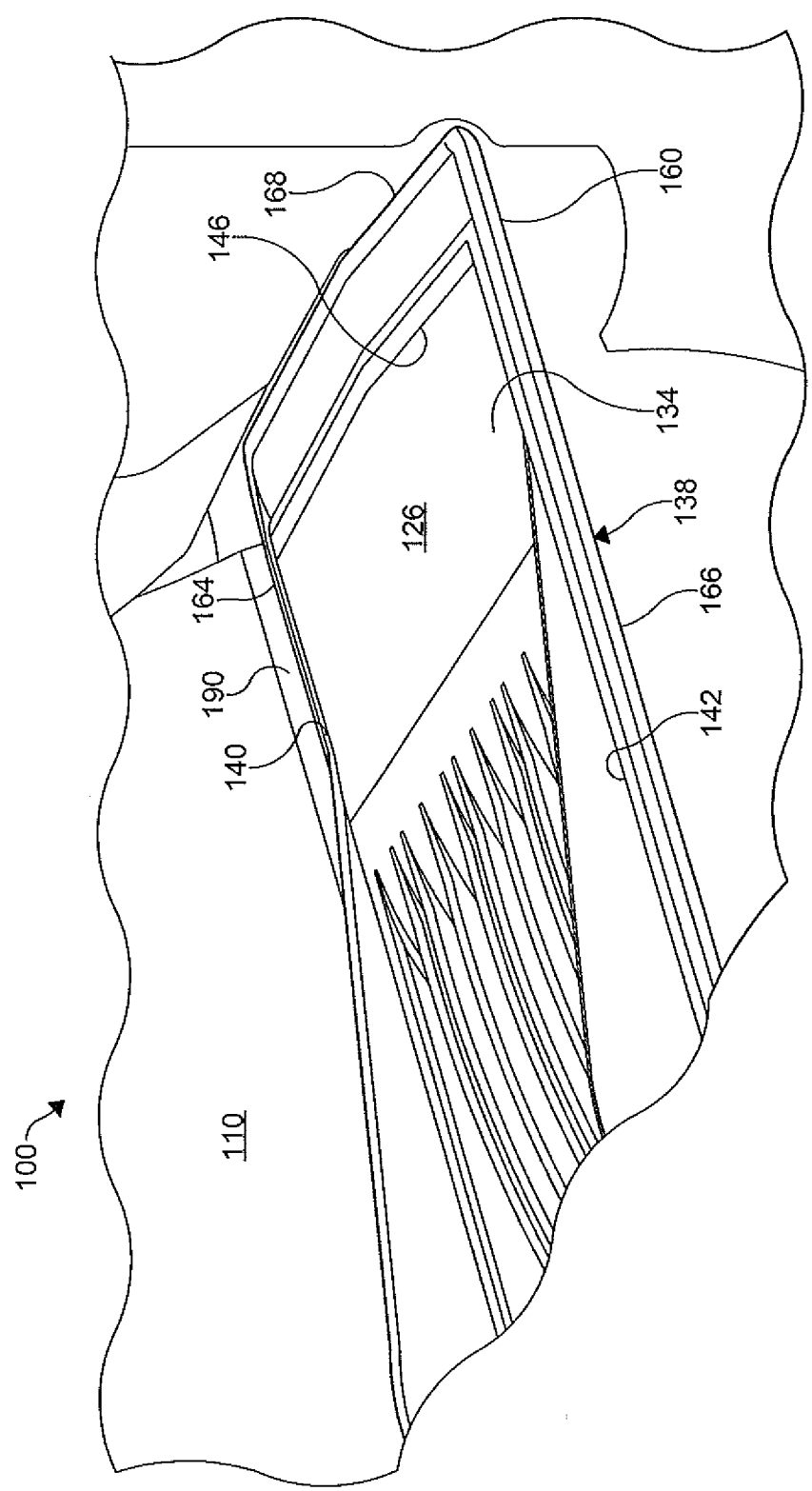
FIG. 3 is a side fragmentary perspective view of a prior art single-stage sealing temperature door.

A known single stage sealing system 100 of a temperature door 126 is shown in FIG. 3 and in FIGS. 4A-4D. For clarity, FIG. 3 and FIGS. 4A-4D depict only a left hand side plenum 110, and further only depict a first sealing surface 134 of the temperature door 126. The first sealing surface 134 includes a peripheral outer edge 138 defined by a first radially extending edge 140, a second radially extending edge 142, and a distal edge 146. A shaft (not shown) is coupled to the first sealing surface 134. A first sealing lip 160 is disposed on the peripheral outer edge 138 of the first sealing surface 134. The first sealing lip 160 of the first sealing surface 134 is defined by a first radial seal 164 disposed on the first radially extending edge 140 of the first sealing surface 134, a second radial seal 166 disposed on the second radially extending edge 142 of the first sealing surface, and a distal seal 168 disposed on the distal edge 146 of the first sealing surface 134.

Figure 4A:
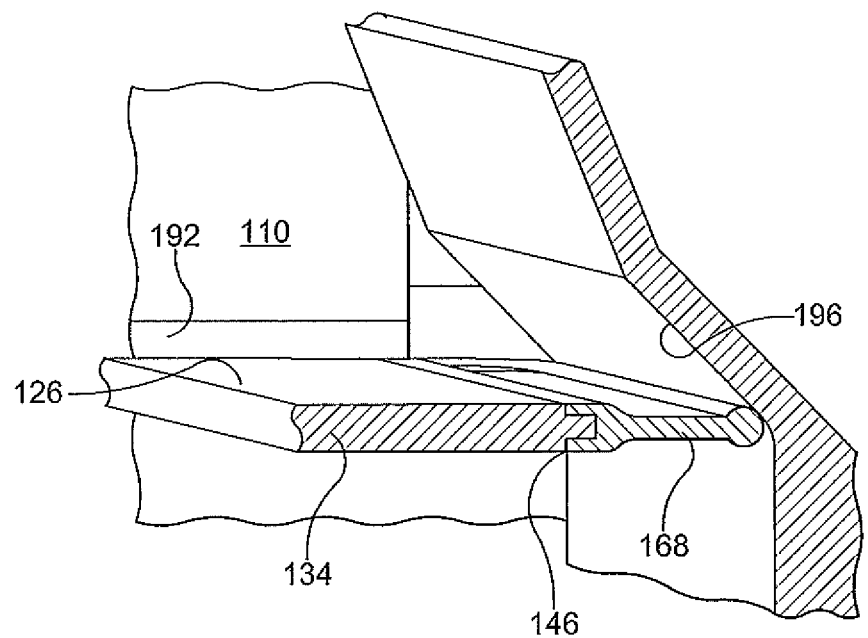
FIGS. 4A-4D are fragmentary sectional views of the single stage sealing temperature door of FIG. 3, showing sealed (FIGS. 4A, 4B) and unsealed positions (FIGS. 4C, 4D).
Figure 4B:
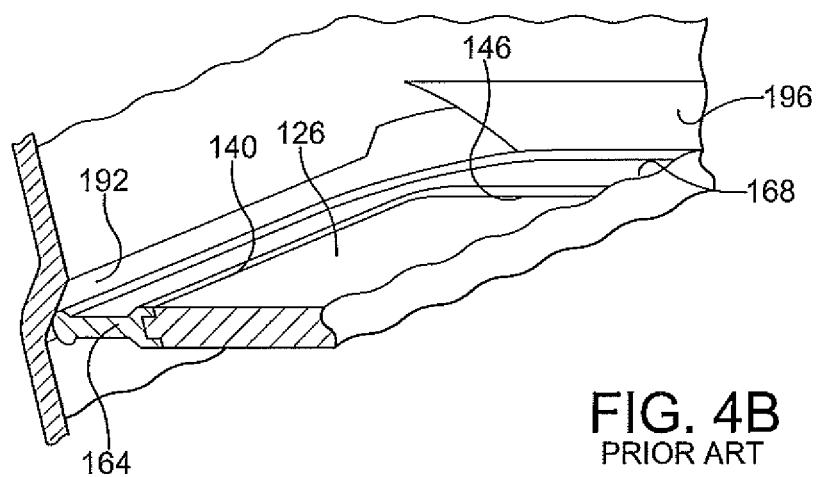
Figure 4C:
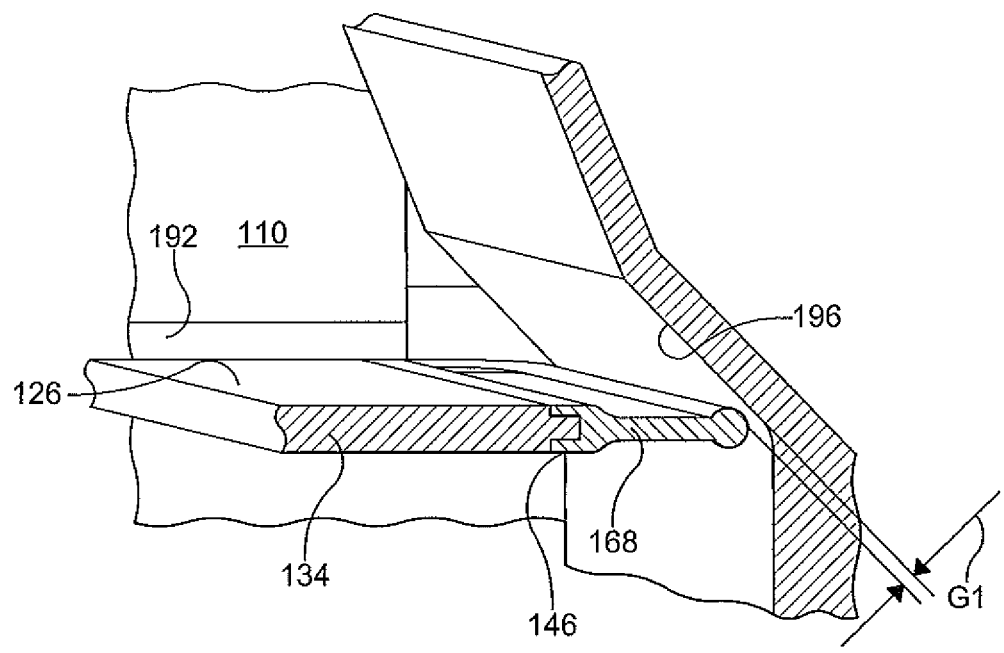
Figure 4D:
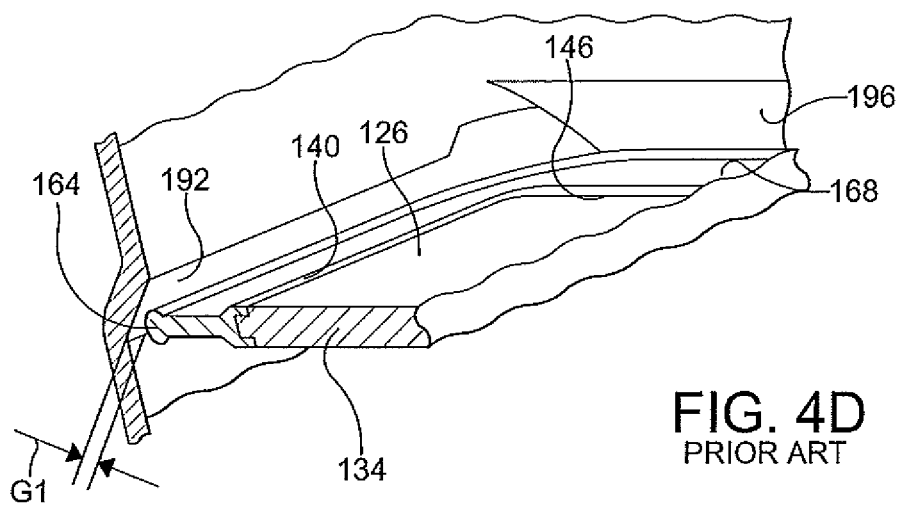

The housing 110 includes a sealing surface 190 adapted to seal against the first sealing lip 160. In particular, the sealing surface 190 includes a first radial sealing surface 192 adapted to seal against the first radial seal 164, a second radial sealing surface (not shown) adapted to seal against the second radial seal (not shown), and a distal sealing surface 196 adapted to seal against the distal seal 168. The first radial seal 164, the second radial seal 166, and the distal seal 168 are shown in FIGS. 4A and 4B in a "touch" seal position. As may be appreciated, rotation of the temperature door 126 clockwise away from the sealing surface 190 will cause the first sealing lip 160 to pull away from the sealing surface 190 in a single stage. In particular, rotation of the temperature door 126 away from the sealing surface 190 will first cause separation between the distal seal 168 and the distal sealing surface 196 at the location farthest away from the axis of rotation (not shown) of the shaft (not shown). As the distal seal 168 separates from the distal sealing surface 196, the first radial seal 164 will also progressively separate from the first radial sealing surface 192. At the same time, the second radial seal 166 will also progressively separate from the second radial sealing surface (not shown). Thus, when the temperature door 126 opens for air to flow past the temperature door 126, the first sealing lip 160 begins to separate from the sealing surface 190 simultaneously at all sealing surfaces. An amount of air flowing past the first sealing lip 160 therefore increases in one single stage in one large step. Then, as shown in FIGS. 4C and 4D, if the temperature door 126 is placed in a position close to the housing 110 to allow only a small amount of airflow, a release gap G1 is formed between the housing 110 and the peripheral outer edge 138. However until the temperature door 126 is sufficiently open to allow a sufficiently large release gap G1 around the peripheral outer edge 138, it is known that most air flow will occur suddenly between the distal seal 168 and the distal sealing surface 196. In other words, at the instant that the temperature door 126 first opens, the release gaps G1 will first appear and be largest at the point farthest away from the temperature door 126 axis of rotation at a point where airflow control is least effective. Moreover, attempts to control the sudden airflow by using small release gaps G1 on the order of one millimeter undesirably increase noise, vibration and harshness (NVH) by promoting whistles, scrapes, hooting and other noises. And finally, if the release gaps G1 are increased in width to minimize NVH and other noises, the amount of airflow past the temperature door 126, especially in the region of the distal sealing lip 168, will be too large to effectively provide temperature linearity control, airflow bleed, and distribution control.

Figure 5:
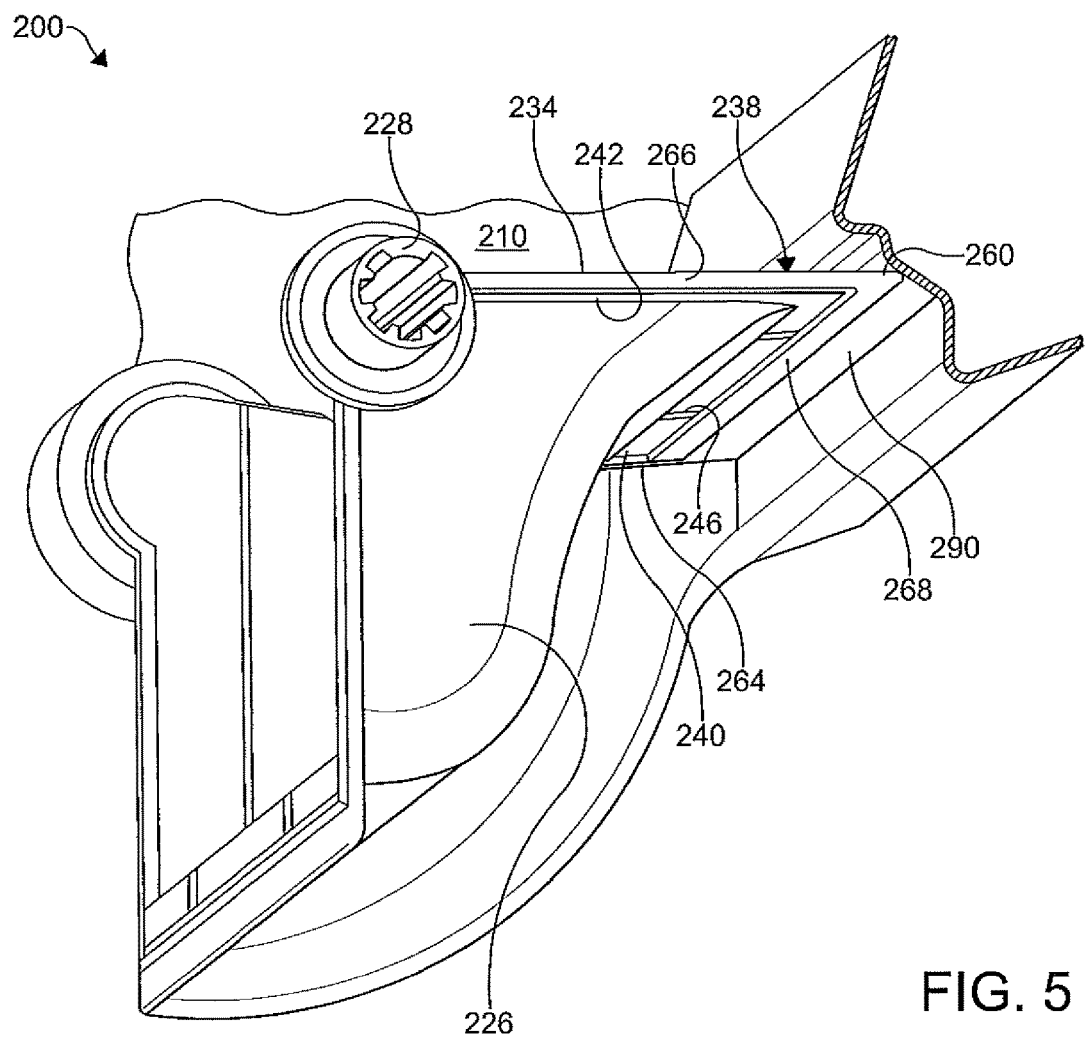
FIG. 5 is a side perspective view of a multi-stage sealing temperature door according to an embodiment of the invention.

A multi-stage sealing temperature door system 200 according to various embodiments of the invention is shown with reference to FIGS. 5-7. For clarity, FIG. 5 depicts only a left hand side plenum housing 210, and further only depicts a first sealing surface 234 of the temperature door 226. The temperature door 226 includes a peripheral outer edge 238 defined by a first radially extending edge 240, a second radially extending edge 242, and a distal edge 246. A pivoting structure or shaft 228 is coupled to the first sealing surface 234. A first sealing lip 260 is disposed on the peripheral outer edge 238 of the first sealing surface 234. The first sealing lip 260 of the first sealing surface 234 is defined by a first radial seal 264 disposed on the first radially extending edge 240 of the first sealing surface 234, a second radial seal 266 disposed on the second radially extending edge 242 of the first sealing surface, and a distal seal 268 disposed on the distal edge 246 of the first sealing surface 234.

The housing 210 includes a sealing surface 290 adapted to seal against the first sealing lip 260. In particular, the sealing surface includes a first radial sealing surface 292 adapted to seal against the first radial seal 264, a second radial sealing surface (not shown) adapted to seal against the second radial seal 266, and a distal sealing surface 296 adapted to seal against the distal seal 268.

Figure 6A:
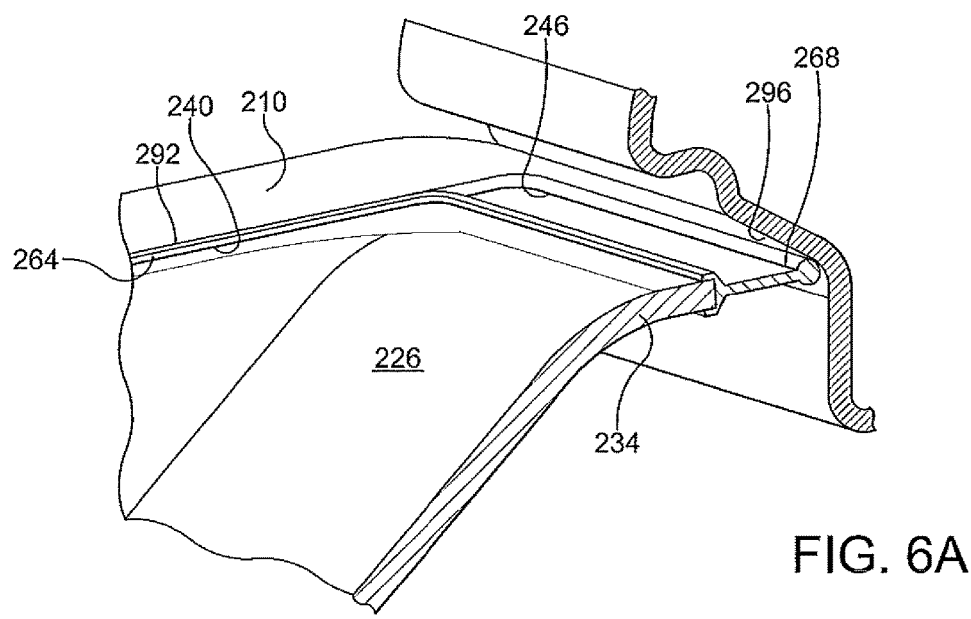
FIGS. 6A-6B are fragmentary sectional views of the perimeter seals in a first seal position of the multi-stage sealing temperature door according to an embodiment of the invention.
Figure 6B:
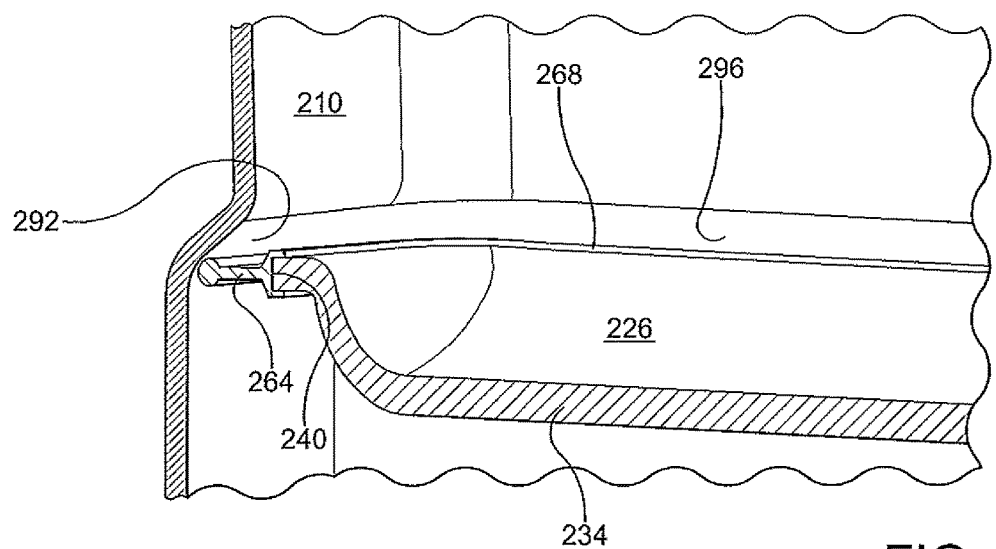

The first radial seal 264, the second radial seal 266, and the distal seal 268 are shown in FIGS. 6A and 6B in a first seal position, where the first sealing lip 260 is fully engaged with the sealing surface 290. In this position, no air flow occurs between the first sealing lip 260 and the sealing surface 290.

Figure 7A:
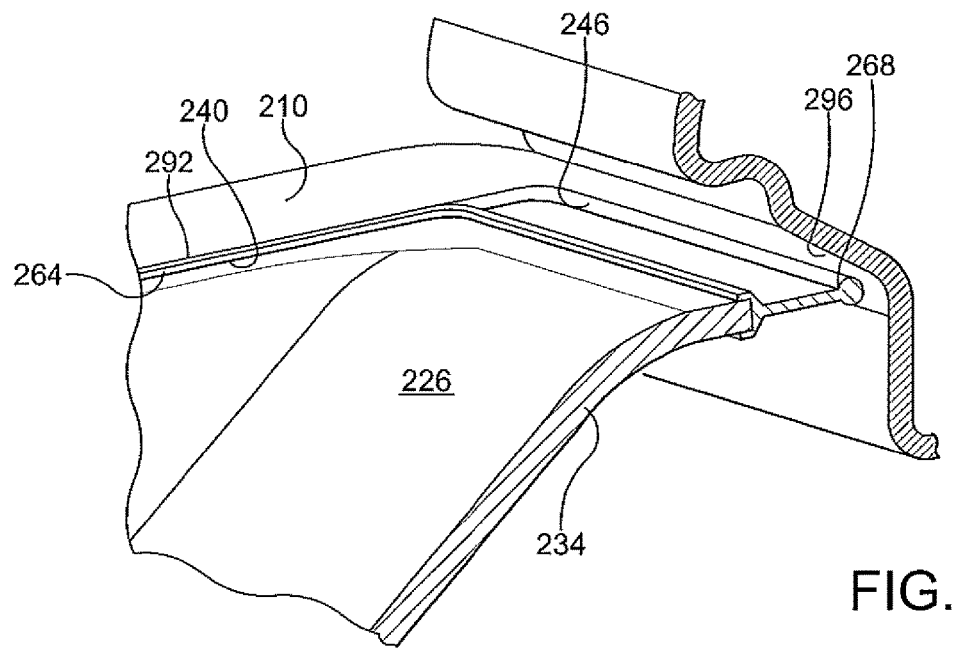
FIGS. 7A-7C are fragmentary sectional views of the perimeter seals in a additional seal position of the multi-stage sealing temperature door according to an embodiment of the invention.
Figure 7B:
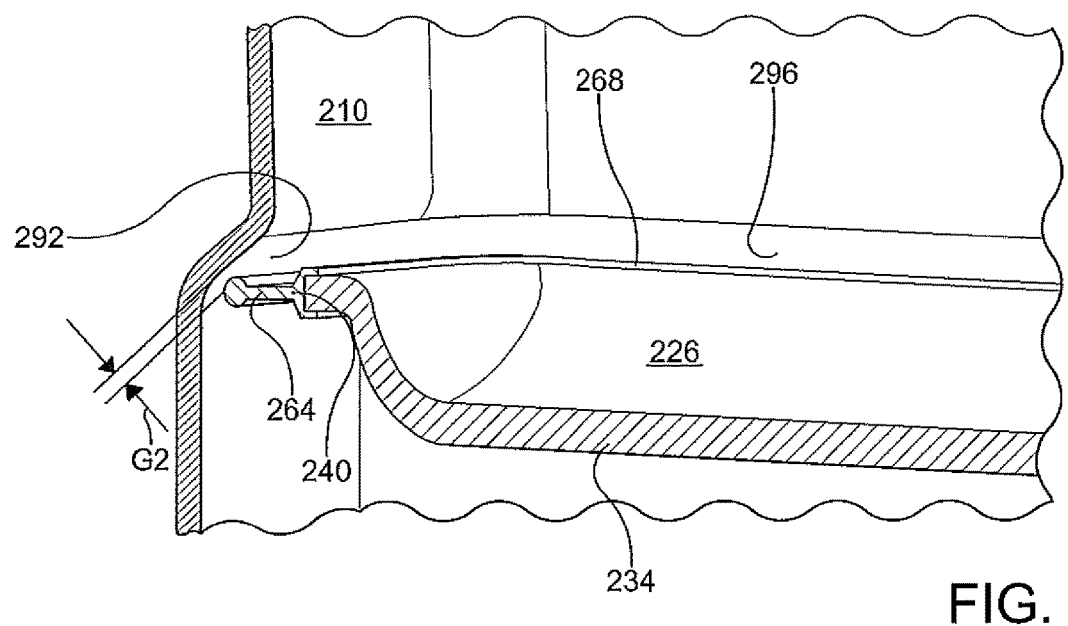

In an embodiment of the invention, as shown in FIGS. 7A and 7B, the multi-stage sealing temperature door system 200 has rotated slightly about shaft 228 from the first seal position of FIGS. 6A and 6B to a second seal position. The rotation about shaft 228 has caused a progressive disengagement of the first radial seal 264 from the first radial sealing surface 292 beginning at a point proximate to the axis of rotation (not shown) of the shaft 228. Similarly, the rotation about the shaft 228 has caused a progressive disengagement of the second radial seal 266 from the second radial sealing surface (not shown). However, the distal seal 268 remains in contact with the distal sealing surface 296 at a point spaced from the axis of rotation (not shown) of the shaft 228.

Once the temperature door 226 is placed in the second seal position close to the housing 210 to control an amount of airflow, a release gap G2 forms between the first radial seal 264 and the first radial sealing surface 292, and between the second radial seal (not shown) and the second radial sealing surface (not shown) in the region proximate the axis of rotation of the temperature door 226, but no release gap will exist along the distal seal 268. The distal seal 268 may be sized and shaped to maintain a sealing interface with the distal sealing surface 296 to create a predetermined maximum width of the release gap G2 that optimizes control of an airflow through the release gap G2 while minimizing NVH and other noises, while further optimizing temperature linearity control, airflow bleed, and distribution control. Favorable results have been shown where the release gap G2 has a maximum width of about 5 millimeters, and more favorable results have been shown where the release gap G2 has a maximum width of approximately 2 millimeters to prevent binding of the temperature door, and to optimize air flow to reduce NVH. It is understood that the width of the release gaps G2 may be adjusted to maintain a desired airflow through the release gaps G2 when the temperature door 226 is in the second seal position. In particular, the width of the release gaps G2 may be fixed or variable around the peripheral outer edge 238 of the temperature door 226 in order to precisely meter and optimize a flow of air passing through the release gaps G2 as the temperature door 226 first opens. Moreover, a relative length of the first radial seal 264 and the second radial seal 266 as compared to a length of the distal seal 268 may also be adjusted to precisely meter and optimize the air flow past the temperature door 226 in the second seal position.

Figure 7C:
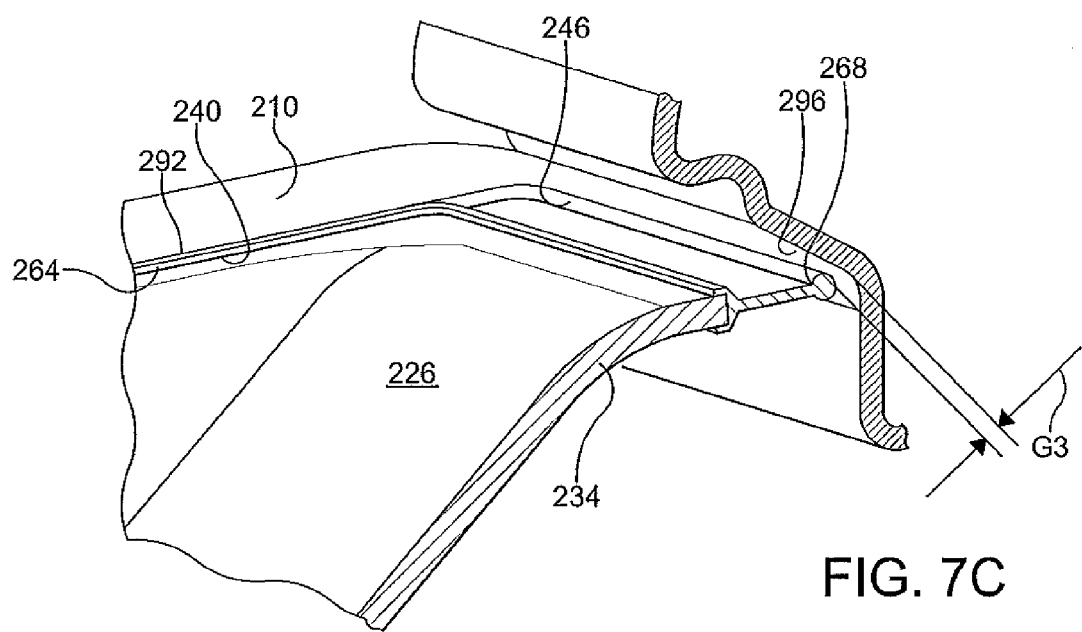

In another embodiment, shown in FIG. 7C, the multi-stage sealing temperature door system 200 may further include a third seal position, wherein an additional rotation of the temperature door 226 about the shaft 228 causes the distal seal 268 to disengage from the distal sealing surface 296 to form a release gap G3 between the distal seal 268 and the distal sealing surface 296 while maintaining the release gap G2 between the first radial seal 264 and the first radial sealing surface 292. Rotation of the temperature door 226 to the third seal position may also maintain and precisely control the release gaps G2 between the second radial seal 266 and the second radial sealing surface, as desired. In one embodiment, a width of the release gap G3 is approximately equal to a width of the release gaps G2, but it is understood that any release gap G2, G3 may be used, as desired. It is further understood that the width of the release gaps G2, G3 may be adjusted to maintain and to optimize a desired airflow through the release gaps G2 when the temperature door 226 is in the third seal position, or indeed, when the temperature door 226 is in any position where the release gaps G2, G3 are formed. In particular, the width of the release gaps G2, G3 may be fixed or variable around the peripheral outer edge 238 of the temperature door 226 in order to precisely meter and optimize a flow of air passing through the release gaps G2, G3 as the temperature door 226 opens to any predefined or predetermined position. Moreover, a relative length and shape of the first radial seal 264, of the second radial seal 266, and of the distal seal 268 may also be adjusted to precisely meter and optimize the air flow past the temperature door 226 in any position where the release gaps G2, G3 are formed. Importantly, however, the present invention provides the ability to precisely form the release gaps G2 before formation of the release gap G3. As a result, the first airflow through the release gaps G2 will be progressive and controllable. Additionally, because the release gap G3 is opened last, a sudden and large amount of air flow will not occur first between the distal seal 268 and the distal sealing surface 296. In other words, at the instant that the temperature door 226 first opens, no release gap G3 will appear at the point farthest away from the temperature door 226 axis of rotation at a point where airflow control is least effective.

The multi-stage sealing temperature door 226 is shown having three sides, resulting in a three-stage temperature door system 200. It is understood that the temperature door 226 may have any number of edges, and may be designed with any number of sealing stages. As a non-limiting example, the temperature door 226 may include six or more sides, and have up to six or more sealing stages. Thus, for example, on a six sided door, the system may release the seals from the six seal surfaces in 1, 2, 3, 4, 5, 6 or more stages. For a three-sided door, the seal can release from the three surfaces in 1, 2, 3 or more stages. The temperature door 226 may include any number of sealing stages, seal profiles, seal lengths, geometries, or the like to optimize and control air flow past the temperature door 226.

Figure 8:
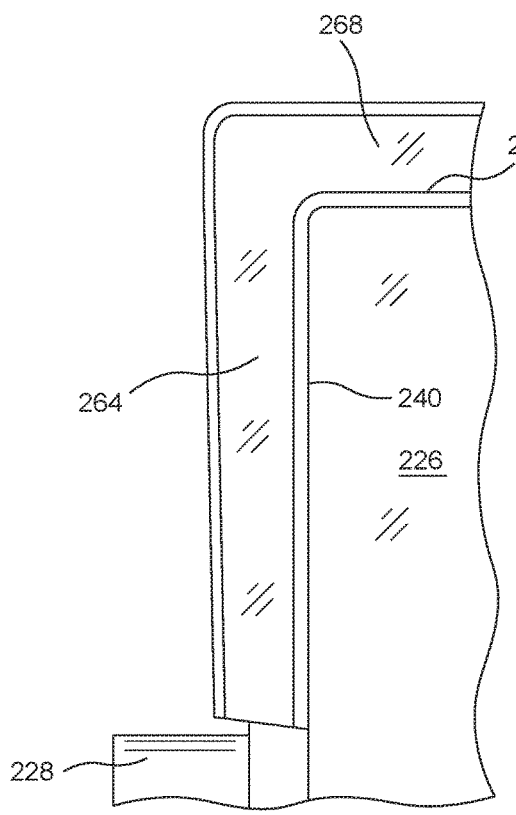
FIG. 8 is a fragmentary top plan view of an embodiment of the multi-stage sealing temperature door having a perimeter seal with a tapered portion.
Figure 9:
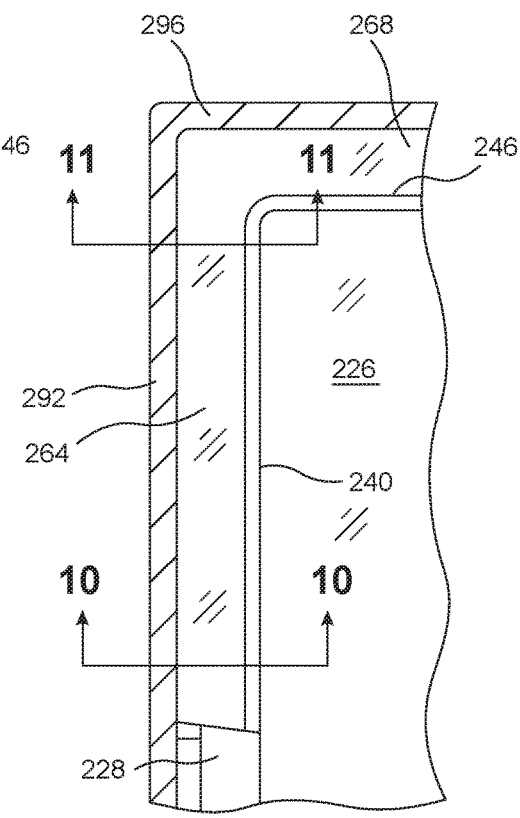
FIG. 9 is a fragmentary sectional view showing a positioning of the multi-stage sealing temperature door of FIG. 8 with respect to a sealing surface of a housing.
Figure 10:
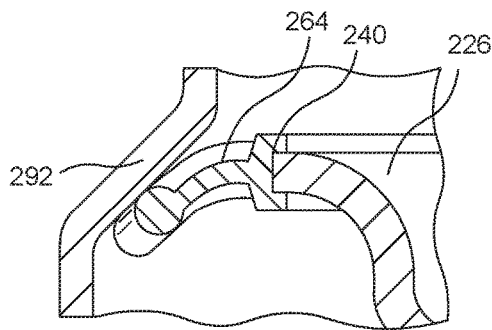
FIG. 10 is a fragmentary sectional view showing a sealing lip of the perimeter seal of the multi-stage sealing temperature door of FIG. 8 having a first overlap distance with respect to the sealing surface of the housing at a location proximate an axis of rotation of the multi-stage sealing temperature door.
Figure 11:
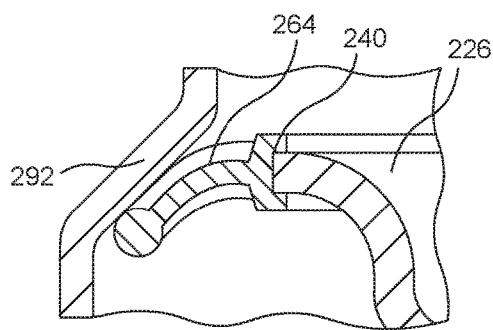
FIG. 11 is a fragmentary sectional view showing the sealing lip of the perimeter seal of the multi-stage sealing temperature door of FIG. 8 having a second overlap distance with respect to the sealing surface of the housing at a location spaced from the axis of rotation of the multi-stage sealing temperature door.

It is understood that the multi-stage sealing temperature door system 200 may be implemented in various ways, depending upon the design requirements. For example, the first sealing lip 260 may be designed to bend or flex, or may be designed with seals that require compression or deflection in order to seal. The first sealing lip 260 may be designed to overlap the sealing surface 290, and each overlapping seal may have multiple sections of overlap having different overlap distances. Each overlapping seal may have multiple lengths, shapes and profiles in order to provide a plurality of stages of seal release and engagement. As shown in FIG. 8, the first radial seal 264 of the temperature door 226 may for example be tapered as the first radial seal 264 extends away from the axis of the temperature door 226. The tapering of the first radial seal 264 causes a variable overlap to exist between the first radial seal 264 and the first radial sealing surface 292, as shown in FIGS. 9-11. FIG. 10 shows a portion of the first radial seal 264 proximate the axis having a first overlap distance present between the first radial seal 264 and the first radial sealing surface 292 and FIG. 11 shows a portion of the first radial seal 264 spaced apart from the axis of the temperature door 226 and proximate the distal seal 268 having a second overlap distance present between the first radial seal 264 and the first radial sealing surface 292, wherein the second overlap distance is greater than the first overlap distance. The presence of different overlap distances at different radial distances from the axis of the temperature door 226 causes the first radial seal 264 to disengage the first radial sealing surface 292 at different times during rotation of the temperature door 226 away from the first seal position. More specifically, the portion of the first radial seal 264 proximate the axis of the temperature door 226 will disengage the first radial sealing surface 292 before the portion of the first radial seal 264 distal from the axis of the temperature door 226 when the temperature door 226 is rotated away from the first seal position. As a non-limiting example, the first sealing lip 260 may be designed to overlap the sealing surface 290 by between 2 mm and 6.5 mm, or more. Also, portions of the sealing surface 290 may have different lengths, or maybe thicker than other portions, or both as desired to provide multiple stages of sealing. A geometry of the housing 210 may be designed to provide multiple stages of sealing. For example, the sealing surface 290 may extend at an angle to the housing 210. As a non-limiting example, the sealing surface 290 may have a design angle that is between 100 degrees and 180 degrees to the portions of the housing 210 that the door seal rotates past. Alternatively, the housing sealing surface 290 may have a predefined height that extends away from the housing 210. As a non-limiting example, the housing sealing surface 290 may extend a distance between 5 mm and 8 mm from the housing 210 to the sealing surface 290.

As noted previously, the multi-stage sealing temperature door system 200 of the present invention system may have a longer seal length along the distal seal 268, located on the edge furthest from the centerline of rotation of the temperature door 226. The multi-stage sealing temperature door system 200 therefore may release air (when unsealing) firstly along the edges closest to the centerline of rotation of the door during rotation from the first seal position to the second seal position, and may then release air lastly along the edge furthest from the centerline of rotation of the door during rotation from the second seal position to the third seal position. As a result, the multi-stage sealing temperature door system 200 allows for the first release of air to be progressive and controllable, while preventing a large release of air at the point furthest from the centerline of rotation of the door 226 where airflow control is least effective.

Additionally, when the temperature door 226 opens for air to flow past it, the air seal breaks in two stages, once in two locations (first radial seal 264 and second radial seal 266) and again in a third location (distal seal 268). When the seal breaks free in multiple stages (e.g., two or more), the amount of air flowing past these locations increases in smaller controlled steps rather than in one large uncontrolled step. Further, when any of the seals 264, 266, 268 open, control of airflow can be accomplished using larger or smaller release gaps G2, as desired. The release gap along the location furthest from the centerline, corresponding to the least controllable position of rotation along the distal edge 246 of the door 226 will open last. In other words, at the instant that the door 226 first opens, a release gap will not exist in those locations furthest away from the centerline of rotation of the door, thereby optimizing effective airflow control. Because the amount of air can be controlled more easily, the amount of angular release can potentially be reduced, providing the option to increase the cross section to support more airflow volume, which could further increase airflow, reduce NVH, or both.

The multi stage sealing designs of the present invention can be used with temperature doors and other ventilation or airflow doors where a controlled bleed is necessary. The multi stage sealing designs improve control and regulation of the amount of air that flows past the temperature door when the door rotates out of the full hot position, for example. This is in contrast with single stage sealing, where as soon as the door opens, air flows past the various sealing surfaces (e.g., three surfaces, sometimes six surfaces) all at one time. With multi stage sealing, when the temperature door rotates from the full hot position, air will flow past the door in two smaller stages that provide improved control of temperature door linearity. The present technology is particularly effective for typical HVAC operating temperatures (−40° C. to 85° C.). This design is not exclusive to specific material compositions, where the door, seal(s), and housing can be formed of various materials.

While certain representative embodiments and details have been shown for purposes of illustrating the invention, it will be apparent to those skilled in the art that various changes may be made without departing from the scope of the disclosure, which is further described in the following appended claims.

What is claimed is:

1. A temperature door for an air handling system, comprising:
   a first surface defining a sealing perimeter;
   a pivoting structure defining an axis, wherein the first surface is coupled to the pivoting structure and configured to pivot about the axis in a housing of the air handling system;
   a sealing lip disposed about the sealing perimeter of the first surface adapted to engage and overlap a corresponding sealing surface of the housing of the air handling system in a first seal position;
   wherein a pivoting of the first surface about the axis from the first seal position causes a disengagement of at least a first portion of the sealing lip from the sealing surface in a location proximate the axis while at least a second portion of the sealing lip remains engaged with the sealing surface at a location spaced from the axis, wherein the at least the first portion of the sealing lip overlaps the sealing surface of the housing by a smaller distance than the at least the second portion of the sealing lip overlaps the sealing surface of the housing.

2. The temperature door for an air handling system of claim 1, wherein the pivoting of the first surface about the axis away from the first seal position causes a progressive disengagement of the sealing lip from the sealing surface beginning at the location proximate the axis and continuing in a direction extending away from the axis, wherein the progressive disengagement of the sealing lip from the sealing surface is caused by a progressively increasing overlap present between the sealing lip and the sealing surface of the housing beginning at the location proximate the axis and continuing in the direction extending away from the axis.

3. The temperature door for an air handling system of claim 1, wherein at least one release gap is formed between the sealing lip and the sealing surface by the disengagement thereof.

4. The temperature door for an air handling system of claim 3, wherein the release gap has a maximum width of between approximately 1 and 5 millimeters.

5. The temperature door for an air handling system of claim 1, wherein a further pivoting of the first surface about the axis away from the first seal position moves the door to a second seal position, the sealing lip spaced from the sealing surface by a release gap.

6. The temperature door for an air handling system of claim 1, wherein the sealing perimeter of the first surface has between two and six sides.

7. A temperature door for an air handling system, comprising:
   a first surface;
   a pivoting structure defining an axis, wherein the first surface is coupled to the pivoting structure and configured to pivot about the axis in a housing of the air handling system;
   the first surface further comprising:
      a first radial edge and a second radial edge extending radially outwardly from the axis, and a distal edge spaced from the axis and extending between the first radial edge and the second radial edge;
      a first radial sealing lip disposed on the first radial edge;
      a second radial sealing lip disposed on the second radial edge; and
      a distal sealing lip disposed on the distal edge, wherein the first radial sealing lip, the second radial sealing lip, and the distal sealing lip define a sealing perimeter of the first surface adapted to engage and overlap a corresponding sealing surface of the housing of the air handling system in a first seal position;
   wherein a pivoting of the first surface about the axis from the first seal position causes a disengagement of at least one of the first radial sealing lip and the second radial sealing lip from the sealing surface in a location proximate the axis while the distal sealing lip remains engaged with the sealing surface at a location spaced from the axis, wherein the at least one of the first radial sealing lip and the second radial sealing lip overlaps the corresponding sealing surface of the housing by a smaller distance at the location proximate the axis than at the location spaced from the axis.

8. The temperature door for an air handling system of claim 7, wherein the pivoting of the first surface about the axis away from the first seal position causes a progressive disengagement of the at least one of the first radial sealing lip and the second radial sealing lip from the sealing surface beginning at the location proximate the axis and continuing in a direction extending away from the axis, wherein the progressive disengagement of the at least one of the first radial sealing lip and the second radial sealing lip from the sealing surface is caused by a progressively increasing overlap present between the at least one of the first radial sealing lip and the second radial sealing lip and the sealing surface of the housing beginning at the location proximate the axis and continuing in the direction extending away from the axis.

9. The temperature door for an air handling system of claim 7, wherein a further pivoting of the first surface about the axis away from the first seal position moves the door to a second seal position, the at least one of the first radial sealing lip and the second radial sealing lip spaced from the sealing surface by a release gap while the distal sealing lip remains engaged with the sealing surface.

10. The temperature door for an air handling system of claim 9, wherein a further pivoting of the first surface about the axis from the second seal position moves the door to a third seal position, the first radial sealing lip, the second radial sealing lip and the distal sealing lip spaced from the sealing surface by a release gap.

11. The temperature door for an air handling system of claim 10, wherein the release gap has a maximum width of between about 1 mm and about 5 mm.

12. The temperature door for an air handling system of claim 9, wherein a further pivoting of the first surface about the axis from the second seal position moves the door to a third seal position, the first radial sealing lip, the second radial sealing lip and the distal sealing lip cooperating with the sealing surface to optimize a flow of air therethrough.

13. The temperature door for an air handling system of claim 7, wherein the distal sealing lip is longer than each of the first radial sealing lip and the second radial sealing lip.

14. A temperature door for an air handling system of a heating, ventilating, and air conditioning system for a vehicle, comprising:
  a first surface;
  a pivoting structure defining an axis, wherein the first surface is coupled to the pivoting structure and configured to pivot about the axis in a housing of the air handling system;
  the first surface further comprising:
    a first radial edge and a second radial edge extending radially outwardly from the axis, and a distal edge spaced from the axis and extending between the first radial edge and the second radial edge;
    a first radial sealing lip disposed on the first radial edge;
    a second radial sealing lip disposed on the second radial edge; and
    a distal sealing lip disposed on the distal edge, wherein the first radial sealing lip, the second radial sealing lip, and the distal sealing define a sealing perimeter of the first surface adapted to engage a corresponding sealing surface of the housing of the air handling system in a first seal position;
  wherein a first pivoting of the first surface about the axis from the first seal position to a second seal position causes formation of a first release gap between the first radial sealing lip and the sealing surface and a second release gap between the second radial sealing lip and the sealing surface while the distal sealing lip remains engaged with the sealing surface at the location spaced from the axis, wherein at least one of the first radial sealing lip and the second radial sealing lip has a progressively increasing overlap with respect to the corresponding sealing surface of the housing as the one of the first radial sealing lip and the second radial sealing lip extends in a direction away from the axis.

15. The temperature door for an air handling system of a heating, ventilating, and air conditioning system for a vehicle of claim 14, wherein the first pivoting causes a progressive disengagement of the first radial sealing lip from a corresponding sealing surface of the housing beginning in at the location proximate the axis to form the first release gap and continuing in a direction away from the axis, wherein the progressive disengagement of the first radial sealing lip from the corresponding sealing surface is caused by a progressively increasing overlap present between the first radial sealing lip and the corresponding sealing surface of the housing beginning at the location proximate the axis and continuing in the direction extending away from the axis.

16. The temperature door for an air handling system of a heating, ventilating, and air conditioning system for a vehicle of claim 14, wherein a further pivoting of the first surface about the axis away from the first seal position moves the door to a second seal position, the first release gap and the second release gap having a substantially equal width while the distal sealing lip remains engaged with the sealing surface.

17. The temperature door for an air handling system of a heating, ventilating, and air conditioning system for a vehicle of claim 16, wherein a further pivoting of the first surface about the axis from the second seal position moves the door to a third seal position, the first radial sealing lip separated from the housing by the first release gap, the second radial sealing lip separated from the housing by the second release gap, and the distal sealing lip separated from the housing by a third release gap.

18. The temperature door for an air handling system of a heating, ventilating, and air conditioning system for a vehicle of claim 17, wherein the first release gap, the second release gap, and the third release gap have a substantially equal width.

19. The temperature door for an air handling system of a heating, ventilating, and air conditioning system for a vehicle of claim 17, wherein each of the first release gap, the second release gap, and the third release gap have a maximum width of between about 1 mm and about 5 mm.

20. The temperature door for an air handling system of claim 14, wherein a further pivoting of the first surface about the axis away from the first seal position moves the door to a seal position, the first radial sealing lip, the second radial sealing lip and the distal sealing lip cooperating with the sealing surface to optimize a flow of air therethrough.

* * * * *